United States Patent [19]

Anderson

[11] 4,271,363

[45] Jun. 2, 1981

[54] APPARATUS AND METHOD FOR SELECTIVELY GENERATING INFRARED RADIATION

[75] Inventor: Norman C. Anderson, San Jose, Calif.

[73] Assignee: ILC Technology, Inc., Sunnyvale, Calif.

[21] Appl. No.: 19,467

[22] Filed: Mar. 12, 1979

[51] Int. Cl.[3] .......................... G01J 1/00; H01K 1/26

[52] U.S. Cl. ................................ 250/504 R; 250/493; 313/9

[58] Field of Search ..................... 313/9; 250/504, 493

[56] References Cited

U.S. PATENT DOCUMENTS

| | | | |
|---|---|---|---|
| 1,385,608 | 7/1921 | Darrah | 313/9 |
| 2,164,183 | 6/1939 | VanLiempt et al. | 250/504 |
| 3,138,697 | 6/1964 | Banca et al. | 250/504 |
| 3,331,941 | 7/1967 | Edwards et al. | 250/504 |

*Primary Examiner*—Harold A. Dixon
*Attorney, Agent, or Firm*—Phillips, Moore, Weissenberger, Lempio & Majestic

[57] ABSTRACT

A selective infrared radiation source includes an opaque body of boron nitride positioned to surround a resistive element capable of being heated by the passage of electrical current therethrough, said boron nitride body and resistive element being enclosed by an outer hermetic envelope transparent to infrared radiation. The method includes heating said resistive element such that the boron nitride is heated to a temperature of between approximately 1200° C. and 2000° C.

7 Claims, 2 Drawing Figures

APPARATUS AND METHOD FOR SELECTIVELY GENERATING INFRARED RADIATION

BACKGROUND OF THE INVENTION

In an infrared (IR) transmitting system, the IR radiation source is the major power consuming component of the system. If the IR source can be designed to more efficiently convert electrical input power into radiation of the desired wavelengths, the efficiency of the system will be improved. In airborne equipment especially, size, weight and operating efficiency are basic design considerations.

Unlike most other materials, boron nitride (BN) has a spectral emittance particularly suited for efficient production of IR radiation at wavelengths longer than approximately 3 micrometers. Additionally, boron nitride is a highly refractory dielectric material. It has excellent thermal shock resistance and is chemically compatible with many refractory materials at high temperatures. Boron nitride is also considerably less brittle than most ceramic materials, suggesting long-lived performance in high vibration environments. The high temperature usefulness of pure boron nitride is limited mainly by its tendency, when heated, to disassociate to elemental boron and nitrogen. Boron nitride also reacts with the air, generating boric oxide ($B_2O_3$) when heated over 1000° C.

The efficiency of boron nitride results from its low emissivity (therefore low radiance) at short wave lengths (visible to 3 micrometers) and an emissivity approaching unity (therefore high radiance) between 3.5 and 5.7 micrometers. Consequently, boron nitride requires less input power does a blackbody source to provide equal radiated power in the 3–5 micrometer band.

In the prior art, pulsed Cesium Arc lamps have been used as IR sources, but such lamps have had marginal efficiency in the wavelength band of interest (3–5 micrometers). Further, such pulsed lamps are short-lived. Mechanically modulated incandescent lamps in general have a better lifetime potential and are more efficient in the 3–5 micrometer band than arc lamps. This is because arc lamps must operate at a higher temperature than incandescent lamps. Thus, since the maximum spectral radiance of a body shifts towards shorter wavelengths as its temperature is increased, the incandescent lamp has a higher fractional output in the spectral band of interest. However, a disadvantage of most incandescent radiators is that they act as blackbody or graybody sources, thereby wasting power by emitting significant amounts of nonuseful visible and short wavelength IR radiation. Further, prior art selectivity radiating IR sources, such as heated pyrex glass sources, are not bright enough, due to the inherent temperature limitations involved with such materials characterized by low refractoriness.

Although boron nitride has been used as a radiator in the prior art in combination with a heater filament, the uses have been as a source for visible radiation, not selective IR radiation. U.S. Pat. No. 2,164,183 to Van Liempt, et al discloses the use of boron nitride as a radiator. The advantage taught in the Van Liempt patent is the use of boron nitride rather than a conventional tungsten filament in the generation of visible radiation. The use of boron nitride apparently enabled uniform filament evaporation, thus lengthening the life of the lamp.

U.S. Pat. No. 1,385,608 to Darrah also described the use of boron nitride to generate visible radiation rather than as a selective radiative IR source. The Darrah apparatus employed a boron nitride envelope as an insulator for enveloping the heating element, enabling the heating wire to exist as a temperature very near to or even exceeding its normal melting point. The Darrah specification does describe the concept of generating selective radiation, but suggests that this is enabled only when the refractory insulator, e.g. BN, is coated with various compounds such as metallic tungsten, which themselves provide the characteristic of selective radiation. The selective radiation characteristics of boron nitride, however, were not taught.

Further, Darrah failed to discover the chemical incompatibility of boron nitride and tungsten at high temperatures (approximately 1500° C. and above). Sealed lamps recently constructed therewith exploded due to the generation of nitrogen gas and tungsten boride. Thus, if tungsten is used, it must not be constructed to be touching or otherwise in a reactive relationship with the boron nitride.

SUMMARY OF THE INVENTION

A principal object of the present invention is to provide a continuous wave selectively radiating IR source wherein the IR radiator and power supply is simpler, more compact, and has a longer source lifetime than IR lamp devices available in the prior art.

Another object of the present invention is to provide an IR radiating source wherein the outer envelope of the apparatus is filled with at least one torr of nitrogen gas to thereby prevent disassociation of the boron nitride element.

A still further object of the present invention is to provide a method of generating spectrally selective continuous wave infrared radiation using a boron nitride radiator operated in a range of at least approximately 1200° C. but not more than approximately 2000° C.

These and other objects and advantages of the present invention will become more clear upon reference to the accompanying drawings and the following description.

The present invention comprises an IR selective radiation source wherein opaque boron nitride is heated to between approximately 1200° C. and 2000° C. to thereby generate IR radiation in a desired 3–5 micrometer wavelength band. The boron nitride is preferably formed either in a cylindrical shape such that it is positionable about a heater element, or formed as layer of boron nitride deposited on the heater element via chemical vapor deposition. Graphite rather than tungsten is used as the heater element of the preferred embodiment due to the chemical incompatibility of tungsten with boron nitride.

The boron nitride and heater are then enclosed in an IR transparent envelope. To prevent oxidation of BN to occur when the BN is heated to its radiating temperature, the enclosure created by this envelope is first caused to have the air evacuated therefrom. To prevent boron nitride dissociation into boron and free nitrogen, the volume within the outer envelope may be backfilled with at least one torr of nitrogen gas. Further, an additional amount of inert gas, preferably xenon, may be backfilled with the nitrogen to limit the effect of the nitrogen on the thermal conductivity of this space, and thus its effect on nonradiative heat losses.

DESCRIPTION OF A PREFERRED EMBODIMENT

Figure 1:
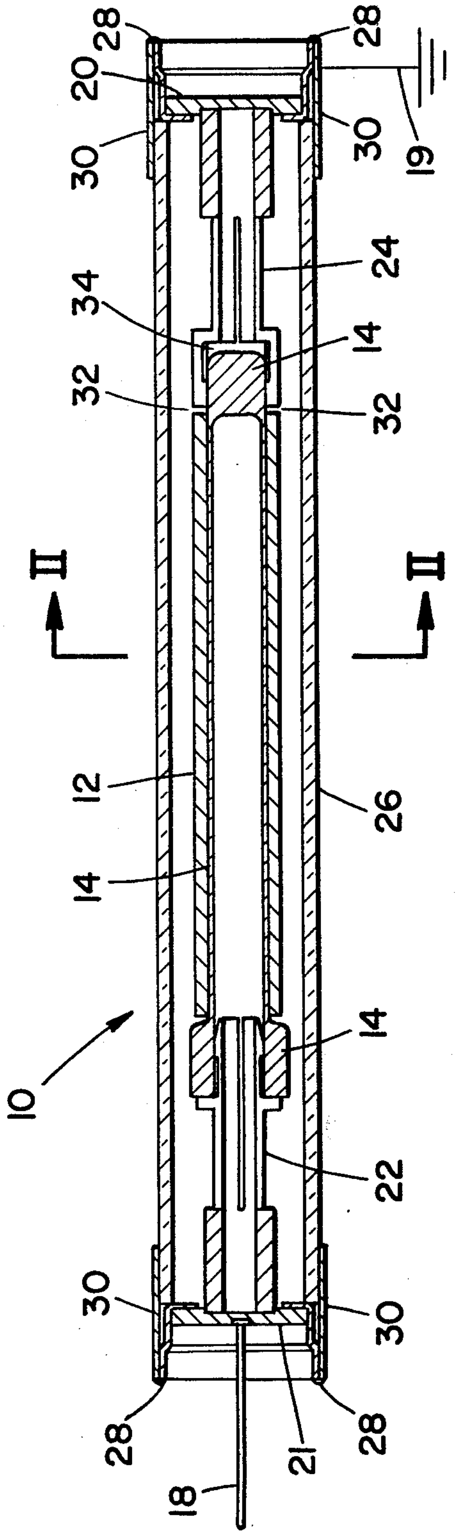
FIG. 1 is a sectional view of an IR radiating source according to the present invention.
Figure 2:
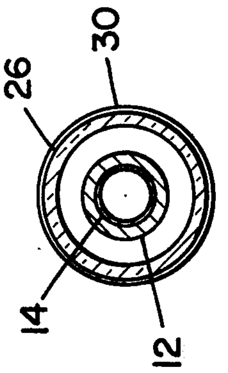
FIG. 2 is a sectional view of the IR radiating source of FIG. 1 taken along the lines II—II of FIG. 1.

A selective infrared radiation source according to the present invention is illustrated at 10 in FIG. 1. The IR source apparatus includes an elongated cylinder of boron nitride shown in section at 12. The simplest means of heating the boron nitride cylinder 12 is via a resistive filament of graphite or other suitable material capable of being heated to the desired temperature and which is nonreactive with the boron nitride. The graphite heater is coaxially mounted inside the boron nitride cylinder 12, as shown at 14, to thereby maximize the capture of filament radiation by the boron nitride. Note that a thin walled graphite cylinder 14 is used in the present embodiment, enabling said wall thickness to control the overall resistance of the graphite and thereby its electrical characteristics.

In an alternate embodiment, the boron nitride cylinder 12 may be formed as a coating of pyrolytic boron nitride chemically vapor deposited on the graphite heater. Note that minimum thickness is required both to generate the spectral emittance characteristics desired and to limit the release of visible radiation generated by the underlying heater. BN coatings of as little as 0.25 milimeters have proved effective. Note that the use of vapor deposited BN may be advantageous in that a very pure BN is formed thereby. This is important because at high temperatures impurities can cause discoloration of the boron nitride surface, thus comprising its selective radiating characteristics. Such impurities may also become deposited on the surrounding envelope tube, causing absorption of IR radiation generated by the boron nitride.

Electrical current is passed through the graphite heater 14 in a conventional manner by means of insulated conductor 18 and the grounding of end cap 20 at ground contact 19. Conductor 18 is coupled to heater 14 by means of end cap 21 and spring fingers 22. The opposite end of the graphite element is connected to end cap 20 by means of spring fingers 24.

The spring fingers 22, 24 provide the function of reducing conductive heat losses by isolating the graphite heater 14 and boron nitride cylinder 12 from the end caps 20, 21.

The boron nitride cylinder 12 is surrounded by a conventional IR transparent cylindrical outer envelope 26. The envelope 26 of the preferred embodiment is composed of an as-grown sapphire cylinder which has good in-line IR transmission characteristics in the 3-5 micrometer range and is relatively inexpensive. Note that a translucent high alumina ceramic cylinder or other suitable transmissive and refractory material may also be used as this outer envelope.

The proximity of the sapphire envelope 26 to the heated boron nitride IR source 12 results in large temperature gradients between the central portion of the envelope 26 and the metal end supports 20, 21 of the source apparatus. To minimize the thermal stress caused by these temperature gradients, the sapphire tube is defined to have a thin wall of the order of 0.7 millimeters, and the sapphire to metal end cap seals 30 are located as far from the radiating source as is practical.

The sapphire envelope is hermetically sealed to Kovar end sleeve 30 by conventional metallizing and copper brazing. The final assembly of the envelope 26 to end caps 20, 21 involves the use of tungsten-inert-gas (TIG) welding of the end caps to the Kovar sleeves of the envelope 26 assembly, as shown in cross section at 28.

To protect the boron nitride 12 from the effects of thermal stress, an annular gap 32 is provided between the boron nitride cylinder 12 and the spring fingers 24 to enable the boron nitride to expand freely in the axial direction. A similar gap 34 is provided between the graphite heater 14 and the spring fingers 24 to enable it to also expand freely in the axial direction.

The dissociation of the boron nitride cylinder 12 into boron and nitrogen gas is suppressed by backfilling the envelope 26 with nitrogen gas. If dissociation were allowed to occur, the free boron would build up on the surface of the boron nitride thereby compromising its selective emissivity characteristics. In the preferred embodiment, nitrogen gas is added to the apparatus after a vacuum of $10^{-6}$ or $10^{-7}$ torr is first created in the source assembly. The dissociation reaction is $2BN \rightarrow 2B + N_2$ which has an equilibrium nitrogen pressure of slightly less than 30 pa (0.2 torr) at 1830° C. Thus, a small partial pressure of approximately 1 torr or more of nitrogen should be maintained in the device to inhibit this dissociation reaction.

In the present embodiment, the source apparatus is backfilled with 20 torr ($2.6 \times 10^3$ Pa) of nitrogen to provide a substantial safety margin for suppression of the dissociation reaction. However, since this nitrogen gas pressure is high enough to allow significant conductive heat transfer through the gas from the boron nitride element 12 to the envelope 26, a high atomic weight inert gas is also mixed with the nitrogen. This is because higher atomic weight gasses have lower conductivity than low weight gases such as nitrogen. The mixture of gases exhibits a thermal conductivity that is approximately a weighted average of the pure constituents. In the present embodiment, xenon is used for this purpose. Therefore with xenon added, a final gas pressure of 180 torr ($2.5 \times 10^4$ Pa) is created in the source apparatus. Note that the higher fill pressure also helps to suppress carbon sublimation. Consequently, in the present embodiment, the internal gas pressure of the source apparatus, i.e., the pressure within the cavity defined by said envelope 26, is approximately 1 atmosphere at the temperature operating range of interest.

It was also found that a tungsten filament would react with boron nitride to create tungsten boride and nitrogen gas. Such an excess of nitrogen, when built up through this chemical reaction, could cause an explosion of the source assembly. Thus, in the preferred embodiment, either a graphite element, or a nontouching tungsten element was found to be required for the proper operation of the infrared radiation source according to the present invention. Graphite was found to remain non-chemically reactive beyond 2000° C., its approximate operating temperature when used to heat the BN to 1900° C.

An additional advantage of boron nitride is that it acts to physically block the sublimation of carbon and carbon-bearing vapors from the graphite heater. A lamp utilizing a plain graphite radiating element, in addition to being less efficient than a BN lamp, would suffer from output fall off due to carbon build up on the outer envelope if operated at high temperatures.

In operation, the graphite heater 14 is caused to be heated by the passage of electrical current therethrough via conductor 18 and ground 19 such that it causes the outer surface of the boron nitride cylinder 12 to operate in the temperature range of at least approximately 1200° C. but not more than approximately 2000° C. At a temperature much higher than 1700° C., the proportion of radiation at visible and near IR wavelength compared to overall radiated power becomes high, despite the selective emittance properties of the BN. Consequently, increased intensity of 3–5 micrometers radiation is achieved at the expense of conversion efficiency.

Similarly, as the desired operating temperature is reduced, at the lower end of the temperature range, a larger and larger radiating source is required, i.e., a greater amount of square centimeter area is required, to get the same level of infrared output radiation in the desired frequency band. Consequently, to prevent the associated optics used in the focusing of the IR beam from being excessively large, the lower limit in the temperature range must of necessity be approximately 1200° C.

Note that the heater is always operated at a temperature slightly hotter than the BN. In the embodiment including a separate BN cylinder, the graphite heater 14 may have to be heated to approximately 2,000° C. and thereby to incandescence to generate a boron nitride cylinder 12 outer surface temperature of approximately 1900° C. That is, a temperature differential of over 100° C. between the graphite heater 14 and the boron nitride cylinder 12 may exist during the normal operation of this embodiment.

It is to be understood that the foregoing description is merely illustrative of a preferred embodiment of the invention and that the scope of the invention is not to be limited thereto but is to be determined by the scope of the appended claims.

What is claimed is:

1. A selective infrared radiation source comprising: an outer hermetic envelope at least a portion of which is transparent to infrared radiation containing substantially only inert gas including sufficient nitrogen gas to substantially limit dissociation of boron nitride when said boron nitride is heated to within the range of approximately 1200° C.–2000° C. and an amount of xenon gas sufficient to substantially limit the effect of the nitrogen gas on the thermal conductivity of said inert gas, an elongated resistive element capable of being heated by the passage of electrical current therethrough supported within said envelope, an opaque body of boron nitride supported within said envelope positioned to surround said resistive element and defined in a chemically non-reactive relationship with said resistive element when said element is at a temperature of up to 2000° C., and means for applying an electric current through said envelope to said resistive element.

2. The infrared radiation source of claim 1 wherein said resistive element is in contact with said boron nitride body and defined to be a material chemically non-reactive with boron nitride when said element is at a temperature of up to 2000° C.

3. The infrared radiation source of claim 2 wherein said resistive element comprises a graphite body.

4. The infrared radiation source of claim 1 wherein the cavity defined by said envelope includes therein at least 1 torr of nitrogen gas.

5. The method of selectively generating continuous wave infrared radiation in the 3–5 micrometer wavelength band comprising the steps of:

(a) fabricating a chemically non-reactive assembly comprising an elongated resistive element capable of being heated by the passage of electrical current therethrough and an opaque body of boron nitride surrounding said resistive element;

(b) mounting said assembly within a hermetic envelope at least a portion of which is substantially transparent to infrared radiation in the 3–5 micrometer wavelength band;

(c) sealing a pair of electrical leads through said hermetic envelope and electrically connecting each of said leads to a different end of said elongated resistive element;

(d) evacuating said hermetic envelope to a vacuum of at least about $10^{-6}$ torr;

(e) backfilling said envelope with at least one torr of nitrogen gas; and (f) passing electrical current through said resistive element by means of said leads to heat said opaque body of boron nitride to an exterior surface temperature of at least about 1200° C. but not more than about 1700° C.

6. The method of claim 5 wherein said chemically non-reactive assembly is fabricated by chemical vapor deposition of boron nitride to a thickness of at least about 0.25 millimeters on a resistive element made of graphite.

7. A method of generating spectrally selective, continuous wave infrared radiation in an apparatus including an elongated resistive element capable of being heated by the passage of electrical current therethrough, surrounded by an opaque body of boron nitride, and contained within a hermetic envelope transparent to infrared radiation, said method comprising the steps of:

(a) evacuating the cavity defined by said envelope to a vacuum of at least $10^{-6}$ torr;

(b) backfilling said envelope cavity with approximately 20 torr of nitrogen gas and with a sufficiently larger amount of xenon gas to limit the effect of the nitrogen gas on the thermal conductivity of said cavity; and (c) passing electrical current through said resistive element to heat said opaque body of boron nitride to an exterior surface temperature of at least approximately 1200° C. but not more than approximately 2000° C.

* * * * *